United States Patent
Kobayashi

(10) Patent No.: US 11,440,734 B2
(45) Date of Patent: Sep. 13, 2022

(54) ARTICLE TRANSPORT SYSTEM

(71) Applicant: TOYOTA JIDOSHA KABUSHIKI KAISHA, Toyota (JP)

(72) Inventor: Yukihiro Kobayashi, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 269 days.

(21) Appl. No.: 16/810,195

(22) Filed: Mar. 5, 2020

(65) Prior Publication Data

US 2020/0299064 A1    Sep. 24, 2020

(30) Foreign Application Priority Data

Mar. 18, 2019   (JP) .............................. JP2019-049569

(51) Int. Cl.
| | | |
|---|---|---|
| G06F 7/00 | (2006.01) |
| B65G 1/137 | (2006.01) |
| G06K 7/10 | (2006.01) |
| G06Q 10/08 | (2012.01) |
| G06K 19/07 | (2006.01) |
| G06K 7/14 | (2006.01) |

(52) U.S. Cl.
CPC ....... *B65G 1/1378* (2013.01); *G06K 7/10445* (2013.01); *G06K 7/1417* (2013.01); *G06K 19/0723* (2013.01); *G06Q 10/087* (2013.01)

(58) Field of Classification Search
USPC ................................. 700/213–215, 226, 228
See application file for complete search history.

(56) References Cited

U.S. PATENT DOCUMENTS

| | | | | |
|---|---|---|---|---|
| 10,303,171 | B1* | 5/2019 | Brady | ................. G05D 1/0297 |
| 10,613,533 | B1* | 4/2020 | Payson | ................. G05D 1/0297 |
| 2020/0209865 | A1* | 7/2020 | Jarvis | ................. G06Q 10/08355 |

FOREIGN PATENT DOCUMENTS

| | | |
|---|---|---|
| JP | 2005-044099 A | 2/2005 |
| JP | 2005-289605 A | 10/2005 |
| JP | 2007-254147 A | 10/2007 |
| JP | 2014-94809 A | 5/2014 |

* cited by examiner

*Primary Examiner* — Yolanda R Cumbess
(74) *Attorney, Agent, or Firm* — Sughrue Mion, PLLC

(57) ABSTRACT

With a parts supply system in which a plurality of parts boxes is transported by a trolley while the parts boxes are unloaded from the trolley at respectively corresponding part-supply places provided on a parts transport route, progress status of supply of the parts boxes to respective unloading places is determined. Information of RFID tags T1 to T10 respectively applied to a plurality of parts boxes B1 to B10 is read by ID tag reading devices 4A, 4B and 4C respectively mounted on trolleys 21, 22 and 23. Thus, the respective parts boxes B1 to B10 that exist on the trolleys 21, 22 and 23 are identified, and information is generated on the progress status of supply of the respective parts boxes B1 to B10 to the part-supply places. Thus, the progress status of the supply of the parts boxes B1 to B10 to the part-supply places is recognized.

20 Claims, 10 Drawing Sheets

FIG.4

|  | Tag(s) that is/are read | Tag(s) that is/are not read |
|---|---|---|
| At time of starting travel | T1,T2,T3 ⋯ T10 |  |
| At time of starting from PS1 | T5,T6,T7 ⋯ T10 | T1,T2,T3,T4 |
| At time of starting from PS2 | T9, T10 | T5,T6,T7,T8 |
| At time of starting from PS3 | T10 | T9 |
| At time of starting from PS4 | None | T10 |

ARTICLE TRANSPORT SYSTEM

CROSS-REFERENCE TO RELATED APPLICATIONS

The present application claims priority under 35 U.S.C. § 119(a) to Japanese Patent Application No. 2019-049569, filed on Mar. 18, 2019. The contents of this application are incorporated herein by reference in its entirety.

TECHNICAL FIELD

The present invention relates to an article transport system. In particular, the present invention relates to improvement of the article transport system in which a plurality of articles is transported by a transport vehicle (trolley or the like) along a transport route so that the articles are unloaded from the transport vehicle at respectively corresponding unloading places located along the transport route.

BACKGROUND ART

Conventionally, a method for recognizing articles is performed. In this method, RFID tags are applied respectively to a plurality of articles transported by a trolley so that a reader-writer reads information of each RFID tag applied to the corresponding article.

Patent Document 1 discloses a method in which: a number of articles each having a RFID tag ("management target articles" in Patent Document 1) are arranged in a plurality of rows and a plurality of columns on each stage of a trolley; when the articles are transported in front of readers-writers provided on both sides of the transport route of the articles, the readers-writers read information from each RFID tag so as to recognize the articles all at once; and the readers-writers further recognize each position of the articles by combining the information with position information of the trolley.

PRIOR ART DOCUMENT

Patent Document

[Patent Document 1] JP 2005-289605 A

SUMMARY OF THE INVENTION

Problem to be Solved by the Invention

In an automobile manufacturing plant and the like, a plurality of articles (parts to be used for manufacturing vehicles, hereinafter simply referred to as "parts") is transported by a trolley along a transport route so that specific parts are unloaded from the trolley and supplied to a corresponding part-supply place (a place adjacent to a work station where the specific parts are needed out of the plurality of parts, i.e. the above unloading place in the plant) disposed along the transport route (parts transport route). In this case, there is a demand for determining the progress status of parts supply to each part-supply place. If such progress status of parts supply can be determined, it is possible to easily recognize that the parts are supplied by mistake (i.e. wrongly supplied) or that the parts supply is delayed, which leads to rapid and efficient countermeasures against wrong supply or delay in parts supply.

However, the system disclosed in Patent Document 1 was not made to meet the above demand. Further improvement was required to realize the system to meet the demand.

The present invention was made in consideration of the above circumstances, an object of which is to provide an article transport system in which a plurality of articles is transported by a transport vehicle along a transport route so that the articles are unloaded from the transport vehicle at respectively corresponding unloading places located along the transport route, and in which progress status of article transport to the respective unloading places can be determined.

Means for Solving the Problem

In order to achieve the above object, the present invention is directed to an article transport system in which a plurality of articles is transported by at least one transport vehicle along a transport route while the plurality of articles is unloaded from the at least one transport vehicle at respectively corresponding unloading places provided along the transport route. The system includes: a tag applied to each of the plurality of articles so as to individually identify the plurality of articles; a tag reading device mounted on the at least one transport vehicle so as to read information of the tag; and a progress management section configured to generate information on progress status of supply of the plurality of articles to the unloading places by identifying the articles that exist on the at least one transport vehicle based on the information of each tag applied to the corresponding one of the plurality of articles on the at least one transport vehicle, which is read by the tag reading device.

Here, the transport vehicle is a vehicle on which a plurality of articles are placed. The transport vehicle means both vehicles with a self-propelling function and without a self-propelling function (such as a trolley).

With the above-described configuration in which a plurality of articles is transported by a transport vehicle along a transport route while the plurality of articles is unloaded from the transport vehicle at respectively corresponding unloading places provided along the transport route, the tag reading device mounted on the transport vehicle reads information of tags of the articles that exist on the transport vehicle. Thus, the articles that exist on the transport vehicle (i.e. the article that remain on the transport vehicle) are recognized. Like this, by continuously recognizing the articles that exist on the transport vehicle, it is possible to recognize the articles that have been unloaded at the respective unloading places. Then, the progress management section generates information on progress status of the article transport to the respective unloading places, by identifying the articles that exist on the transport vehicle based on the information, which has been read by the tag reading device, of the tags applied to the articles on the transport vehicle. Specifically, the progress management section generates information by which the progress status of unloading operation of the articles at the respective unloading places can be determined when the transport vehicle is traveling on the transport route. As a result, it is possible to recognize any case in which a certain article has not been unloaded appropriately at the corresponding unloading place (that is, the fact that the article is not unloaded appropriately can be determined by recognizing that the article that should be unloaded still remains on the transport vehicle). Furthermore, it is possible to determine whether the actual timing for transporting the article to the predetermined unloading place is delayed or not compared to the scheduled timing (i.e. it is possible to recognize whether the delay in transport of the articles occurs or not).

The above-described transport vehicle is a trolley that is towed by a tow vehicle in which a worker rides to drive and that is transported on the transport route. A display device is provided in a manner of being carried by the worker or being mounted on the tow vehicle so that an image of progress status is displayed on the display device based on the information on the progress status generated by the progress management section.

With the above-described configuration, the worker who rides and drives the tow vehicle can recognize the current progress status of the article transport to the respective unloading places by looking at the image of progress status displayed on the display device while driving the tow vehicle. More specifically, the driver can drive the tow vehicle while confirming the information, for example, as to whether the articles are appropriately transported to the respective unloading places (whether any wrong transport of the articles occurs) or as to whether there is any delay in transport of the articles at the moment.

The above-described transport vehicle is configured as a self-propelled vehicle on the transport route, and includes a control section that controls travel of the transport vehicle. The control section controls the travel of the transport vehicle based on the information on the progress status generated by the progress management section.

With the above-described configuration, the travel of the transport vehicle (e.g. the destination of the transport vehicle) is controlled based on the information on the progress status generated by the progress management section. For example, when it is determined that the transport vehicle still contains the article that should be unloaded at the unloading place where the transport vehicle has already passed, it is possible to control the travel of the transport vehicle such that the transport vehicle returns to the passed part-supply place, which makes it possible to quickly transport the article to the part-supply place.

Also, the above-described article transport system includes an information storage section that is configured to store the information on the progress status generated by the progress management section.

With the above-described configuration, the information on the progress status that is stored in the information storage section can be used as information to analyze a cause of wrong supply or delay in supply when such an incident occurs.

The above-described display device is configured to display information on the articles that should be unloaded at the respective unloading places.

With the above-described configuration, in the case in which the worker unloads the articles from the transport vehicle, the worker understands which articles should be unloaded at the respective unloading places by looking at the display of the display device, and unloads actually the corresponding article from the transport vehicle. Thus, the worker is not required to memorize which articles should be unloaded at the respective unloading places, which can reduce the burden on the worker and also prevent the wrong supply of the articles.

As to the specific configuration of the above-described tags and the tag reading device, the following are exemplarily included.

That is, the tag applied to each of the plurality of articles is an RFID tag, and the tag reading device is an ID tag reading device that is configured to read information of the RFID tag.

Also, the tag applied to each of the plurality of articles is a two-dimensional code, and the tag reading device is a camera configured to take an image of the two-dimensional code.

With the above-described configuration, it is possible to specifically identify the tags and the tag reading device, which improves practicality of the article transport system of the present invention.

Advantageous Effect of the Invention

In an article transport system of the present invention, a plurality of articles is transported by a transport vehicle along a transport route while the plurality of articles is unloaded from the transport vehicle at respectively corresponding unloading places provided along the transport route. Information of tags respectively applied to the plurality of articles is read by a tag reading device mounted on the transport vehicle. Thus, the respective articles that exist on the transport vehicle are identified. Based on the above, information is generated on progress status of transport of the respective articles to the unloading places. In this way, it is possible to recognize the progress status of transport of the articles to the unloading places.

BRIEF DESCRIPTION OF THE DRAWINGS

FIG. 4 is a table indicating one example of relationships between locations of the trolleys and the kinds of RFID tags that are read/are not read at the respective locations.

DESCRIPTION OF EMBODIMENTS

Hereinafter, an embodiment of the present invention will be described with reference to the drawings. In this embodiment, the description is given on a case in which the present invention is applied to a parts supply system (article transport system) in an automobile manufacturing plant, in which: a plurality of parts boxes is placed on a trolley ("transport vehicle" in the present invention); a plurality of trolleys is coupled to be towed by a tow vehicle; specific parts boxes ("articles" in the present invention) are unloaded from the trolley at a corresponding part-supply place (a place adjacent to a work station where the specific parts are needed out of the plurality of parts, i.e. "unloading place" in the present invention) disposed along a parts transport route.

—Parts Transport Route—

Figure 1:
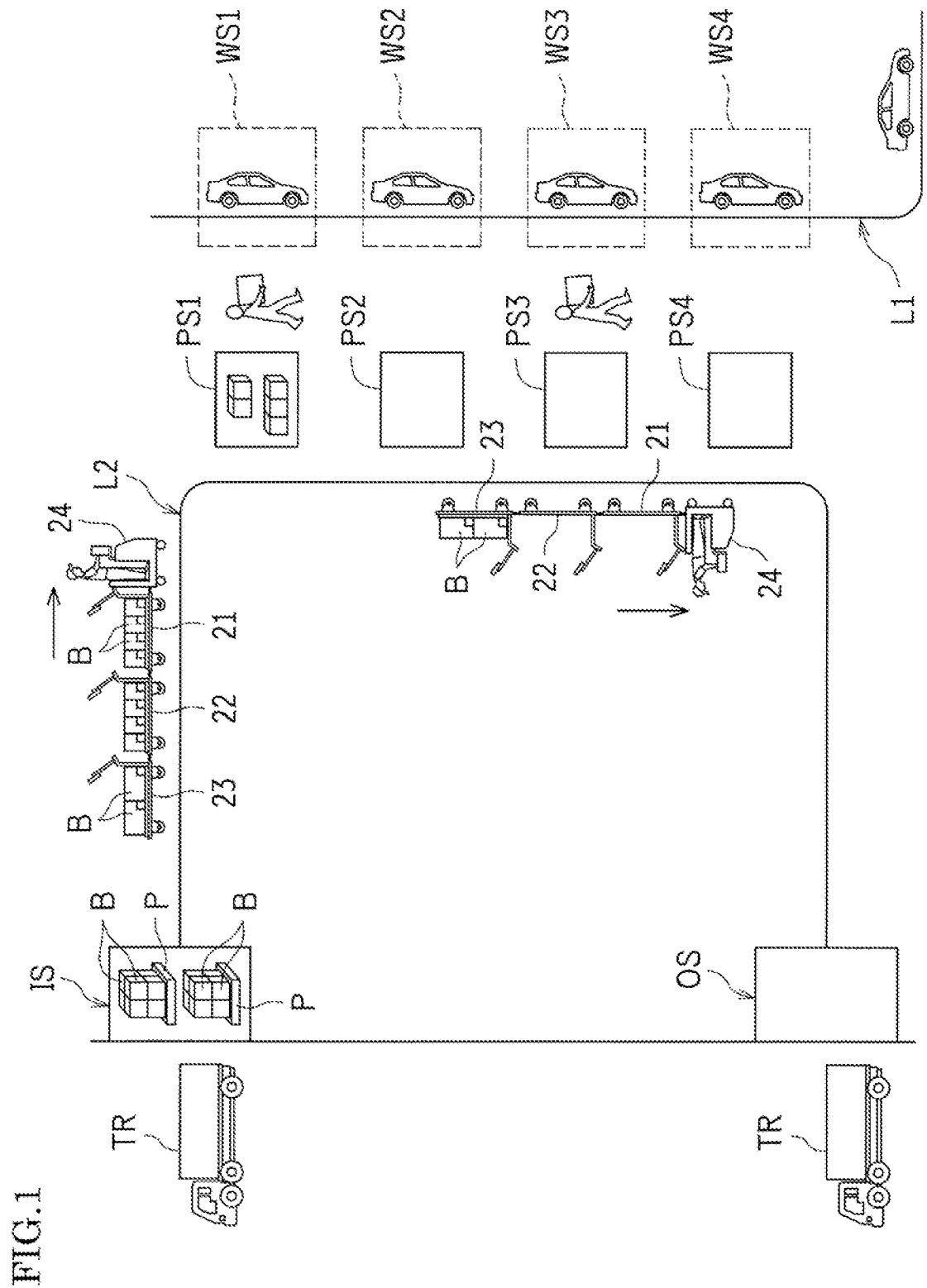
FIG. 1 is a schematic diagram illustrating a vehicle production line and a parts transport route in a plant according to an embodiment.

FIG. 1 is a schematic diagram illustrating a vehicle production line L1 and a parts transport route L2 in a plant according to this embodiment. As shown in FIG. 1, the parts transport route L2 extends in the plant, from a parts receiving station IS to an empty box returning station OS. A plurality of parts boxes B, which contains parts to be used for manufacturing vehicles, is transported by a truck TR to a parts receiving station IS from a supplier or a physical distribution transfer center. Thus transported parts boxes B are arranged on a pallet P during skid packing.

Out of the transported parts boxes B transported to the parts receiving station IS, specific parts boxes B (i.e. B1 to B10, see FIG. 2) are distributed into and placed on the trolleys 21, 22 and 23. Then, the trolleys 21, 22 and 23 are coupled to each other and towed by a tow vehicle 24 and transported along the parts transport route L2. Part-supply places PS1, PS2, PS3 and PS4 are defined on the parts transport route L2 to be located respectively adjacent to work stations WS1, WS2, WS3 and WS4 on the vehicle production line L1. Specific parts boxes B (B1-B10) needed for the respective part-supply places PS1, PS2, PS3 and PS4 are sequentially unloaded from the trolleys 21, 22 and 23 at the corresponding part-supply place, out of the parts boxes B (B1 to B10) placed on the trolleys 21, 22 and 23. The parts contained in the boxes B unloaded at any of the part-supply places PS1, PS2, PS3 and PS4 are used for manufacturing the vehicles at the corresponding adjacent work station WS1, WS2, WS3 or WS4.

In the example shown in FIG. 1, the work stations WS1, WS2, WS3 and WS4 are respectively provided at four points on the vehicle production line L1, and the part-supply places PS1, PS2, PS3 and PS4 are provided respectively adjacent to the four work stations. Hereinafter, the work stations WS1, WS2, WS3 and WS4 on the vehicle production line L1 are referred to as a first work station WS1, a second work station WS2, a third work station WS3 and a fourth work station WS4 from the upstream to the downstream in the flow direction of the vehicle production line L1. Also, out of the part-supply places PS1, PS2, PS3 and PS4 on the parts transport route L2, the place adjacent to the first work station WS1 is referred to as a first part-supply place PS1, the place adjacent to the second work station WS2 is referred to as a second part-supply place PS2, the place adjacent to the third work station WS3 is referred to as a third part-supply place PS3, and the place adjacent to the fourth work station WS4 is referred to as a fourth part-supply place PS4. As to the work stations WS1, WS2, WS3 and WS4 and the part-supply places PS1, PS2, PS3 and PS4, the respective numbers of the stations/places are not limited thereto.

Figure 2:
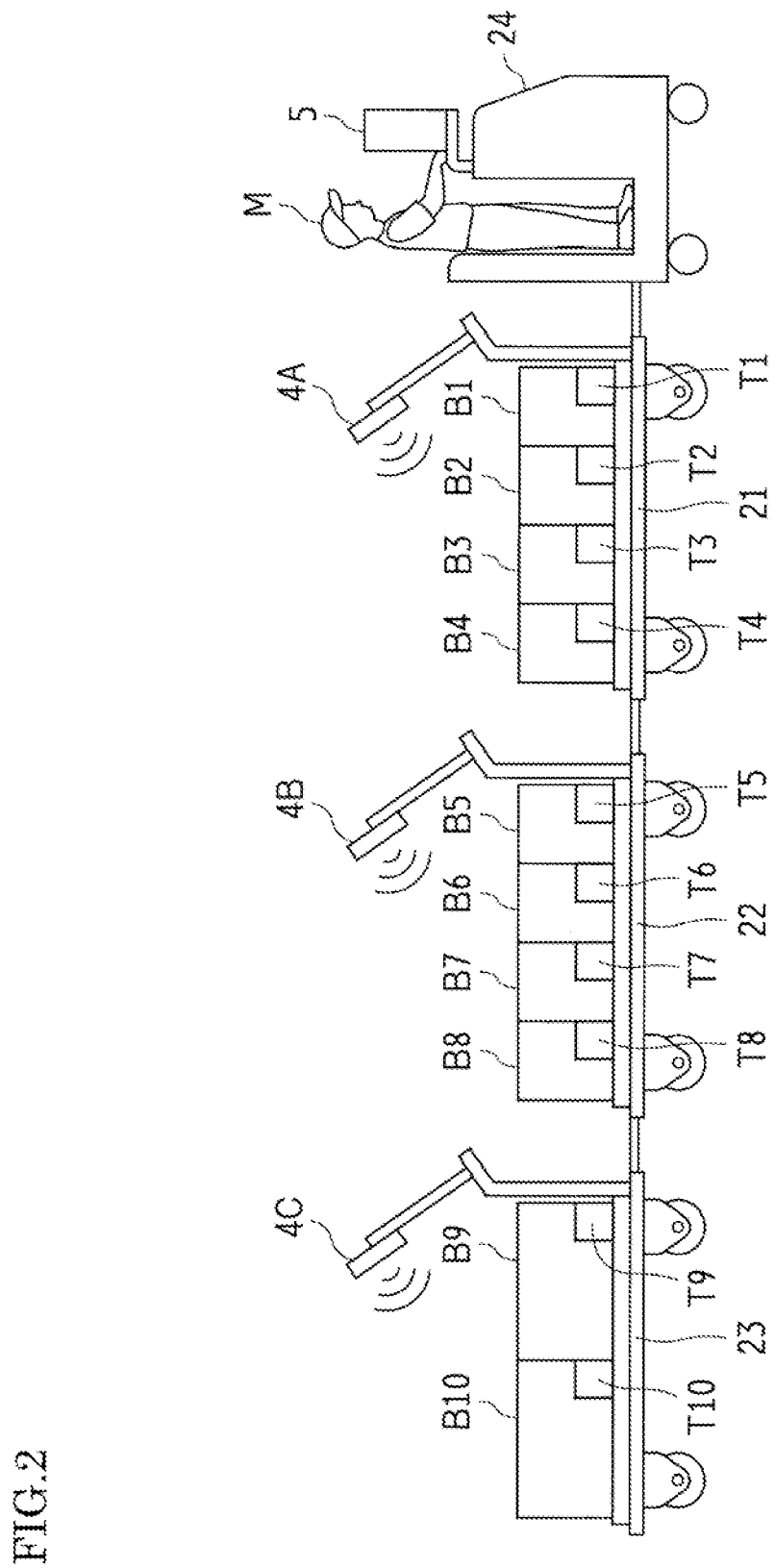
FIG. 2 is a schematic diagram illustrating a tow vehicle towing a plurality of coupled trolleys.

FIG. 2 is a schematic diagram illustrating the tow vehicle 24 towing the coupled trolleys 21, 22 and 23. In this embodiment, three trolleys 21, 22 and 23 are coupled in series with each other and towed by the tow vehicle 24, as shown in FIG. 2. Also in this embodiment, ten parts boxes B1 to B10 are distributed into and placed on the trolleys 21, 22 and 23. More specifically, four parts boxes (a first parts box B1, a second parts box B2, a third parts box B3 and a fourth parts box B4) are placed on a first trolley 21 positioned on the most front side. Four parts boxes (a fifth parts box B5, a sixth parts box B6, a seventh parts box B7 and a eighth parts box B8) are placed on a second trolley 22 positioned on the second front side. Two parts boxes (a ninth parts box B9 and a tenth parts box B10) are placed on a third trolley 23 positioned on the end side. A worker M rides in the tow vehicle 24 to drive the tow vehicle 24. Thus, the tow vehicle 24 towing the trolleys 21, 22 and 23 travels along the parts transport route L2 (see FIG. 1).

—Overall Configuration of Parts Supply System—

Here, the overall configuration of a parts supply system 1 in this embodiment is described.

Figure 3:
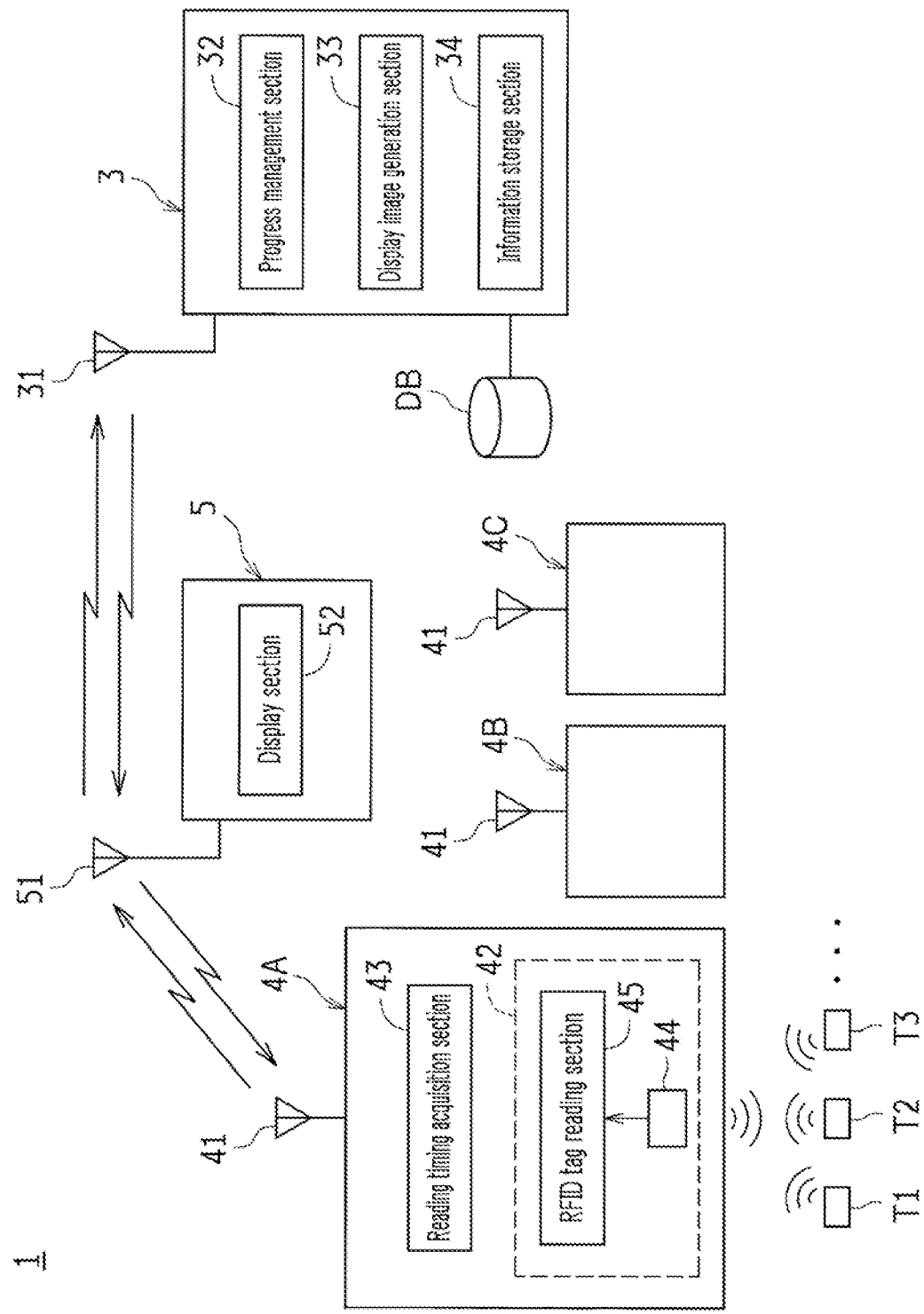
FIG. 3 is a block diagram illustrating a schematic configuration of a parts supply system.

FIG. 3 is a block diagram illustrating a schematic configuration of the parts supply system 1. As shown in FIG. 3, the parts supply system 1 includes: a host computer 3; ID tag reading devices 4A, 4B and 4C respectively mounted on the trolleys 21, 22 and 23; RFID tags T (T1, T2, T3 and so on) each attached (applied) to a corresponding parts box out of the parts boxes B1 to B10; and a monitoring device (display device) 5 that is carried by the worker M who rides in the tow vehicle 24 or that is mounted on the tow vehicle 24.

Hereinafter, when each RFID tag T attached to the corresponding parts box out of the parts boxes B1 to B10 is individually described, the reference signs T1 to T10 are assigned to the respective RFID tags T.

The parts boxes B1 to B10 contain respective parts (not shown). As shown in FIG. 2, the RFID tags T1-T10 are respectively attached on side surfaces of the parts boxes B1 to B10. The RFID tags T1-T10 respectively attached to the parts boxes B1 to B10 each have a different ID. Thus, the respective parts boxes B1 to B10 can be individually recognized (i.e. the parts boxes B are respectively identified) by reading information of the RFID tags T1-T10.

Wireless LAN allows data (information) to be transmitted between the monitoring device 5 and the ID tag reading devices 4A, 4B and 4C, via transceivers 51 and 41.

Wireless LAN also allows data (information) to be transmitted between the monitoring device 5 and the host computer 3, via transceivers 51 and 31.

Database DB is connected to the host computer 3. The database DB aggregates and stores respective kinds of information of the plurality of parts boxes B in the plant (i.e. information on kinds and number of the parts contained in the respective parts boxes B, information on the part-supply places PS1, PS2, PS3 and PS4 where the parts boxes B1 to B10 are to be unloaded, information on timings to supply the parts boxes B1 to B10 to the respective part-supply places PS1, PS2, PS3 and PS4, and information on suppliers of the parts).

The respective ID tag reading devices 4A, 4B and 4C have the same configuration. Each of them includes: the transceiver 41; a reader-writer (tag reader) 42 to read information of the RFID tags T (T1, T2, T3 and so on); and a reading timing acquisition section 43.

The reader-writer 42 includes an antenna 44 and an RFID tag reading section 45. The antenna 44 receives (reads) data (information) from the RFID tags T that are in its reading area (radio wave receiving area). The antenna 44 is a dipole antenna. Also, a plurality of antennas may be provided in the reader-writer 42, if necessary.

The RFID tag reading section 45 reads the information possessed by the RFID tag T (i.e. information for identifying (recognizing) each parts box B1 to B10) via the antenna 44.

The ID tag reading devices 4A, 4B and 4C are respectively mounted on the trolleys 21, 22 and 23. The respective readers-writers 42 of the ID tag reading devices 4A, 4B and 4C each have a different reading area for reading the RFID tags T. In particular, the reading area read by the reader-writer 42 of the ID tag reading device 4A mounted on the first trolley 21 is an area over the first trolley 21. That is, when the parts boxes B exist on the first trolley 21 (when the parts boxes remain on the first trolley 21), the reader-writer 42 of the ID tag reading device 4A mounted on the first trolley 21 reads information of the RFID tags T (T1, T2, T3 and T4) of the parts boxes B. Also, the reading area read by the reader-writer 42 of the ID tag reading device 4B mounted on the second trolley 22 is an area over the second trolley 22. That is, when the parts boxes B exist on the second trolley 22 (when the parts boxes remain on the second trolley 22), the reader-writer 42 of the ID tag reading device 4B mounted on the second trolley 22 reads information of the RFID tags T (T5, T6, T7 and T8) of the parts boxes B. Furthermore, the reading area read by the reader-writer 42 of the ID tag reading device 4C mounted on the third trolley 23 is an area over the third trolley 23. That is, when the parts boxes B exist on the third trolley 23 (when the parts boxes remain on the third trolley 23), the reader-writer 42 of the ID tag reading device 4C mounted on the third trolley 23 reads information of the RFID tags T (T9 and T10) of the parts boxes B.

In the above explanation, the reading areas respectively read by the readers-writers 42 of the ID tag reading devices 4A, 4B and 4C are completely separated from each other. However, the present invention is not limited thereto. The reading areas respectively read by the readers-writers 42 of the ID tag reading devices 4A, 4B and 4C may be overlapped with each other. For example, the reading area read by the reader-writer 42 of the ID tag reading device 4A mounted on the first trolley 21 may include not only the area over the first trolley 21, but also the area on the second trolley 22 close to the first trolley 21.

The reading timing acquisition section 43 acquires a timing (time information) of when the reader-writer 42 reads information of the RFID tag T. Specifically, the ID tag reading devices 4A, 4B and 4C each have time measurement means for capturing the time of when the reader-writer 42 reads information of the RFID tag T. In this way, it is possible to associate the RFID tags T with the respective timings (times) of when the RFID tags T are read.

As to the timing when the reader-writer 42 reads information of the RFID tags T, the reader-writer 42 is configured to perform reading at a predetermined time interval (for example, at a predetermined time interval when the tow vehicle 24 is traveling). Also, a sensor (a passing sensor or the like that detects the position of the trolley, not shown) may be provided to detect the leaving or departing of the tow vehicle 24 from the part-supply place PS1 (PS2, PS3 or PS4), and at the timing when the motion of the trolley is detected, the reader-writer 42 may read information of the RFID tags T. Furthermore, the worker M may instruct the reader-writer 42 to read information of the RFID tags T.

When the ID tag reading devices 4A, 4B and 4C read information of the RFID tags T using the respective readers-writers 42 (information including both cases in which: the parts box B exists on the trolleys 21, 22 and/or 23 and thus the information of the RFID tag T is read; and the parts box B does not exist on the trolleys 21, 22 and 23 and thus the information of the RFID tag T is not read), the ID tag reading devices 4A, 4B and 4C associate the information of the RFID tags T (i.e. the information that the parts box B exists or the information that the parts box B does not exist) with corresponding information on the reading timing (time) so as to transmit the associated information to the monitoring device 5 by the transceiver 41. Further, the monitoring device 5 that receives the associated information transmits the received associated information to the host computer 3 by the transceiver 51.

—Communication Using RFID—

Here, a description is given on communication between the reader-writer 42 and the RFID tags T (T1, T2, T3 and so on). This communication is near-field wireless communication of the radio frequency and uses a UHF (ultra-high frequency)-band RFID system. For example, the communication is performed in an ultra-high frequency band of 860 to 960 MHz and in the range of several meters. Various RFID systems such as an HF (high frequency)-band RFID system of the electromagnetic induction can also be used.

The RFID tag T (T1, T2, T3 or the like) is a conventional RFID tag that includes: an RFID IC chip having a memory circuit and a logic circuit; and an antenna element connected to the IC chip. A dipole antenna is used as the antenna element.

The antenna 44 of the reader-writer 42 emits a radio wave toward the surrounding area, and the RFID tags T (T1, T2, T3 and so on) that exist within the area where the radio wave reaches receive the radio wave. As a result, an electric current flows in each circuit inside the respective RFID tags T (T1, T2, T3 and so on) so that information stored in the IC chip is converted into a signal. Then, the signalized information is transmitted from each of the RFID tags T (T1, T2, T3 and so on) to the antenna 44 of the reader-writer 42. When the antenna 44 of the reader-writer 42 receives the signals from the RFID tags T (T1, T2, T3 and so on), such received signals are transmitted to the ID tag reading device 4. Thus, the information of the RFID tags T (T1, T2, T3 and so on) is acquired (read).

—Configuration to Determine Progress Status of Parts Supply—

In the parts supply system 1 as described above in the automobile manufacturing plant, there is a need to determine a progress status of parts supply to each of the part-supply places PS1, PS2, PS3 and PS4. If such progress status of parts supply can be determined, it is possible to easily recognize that the parts are supplied by mistake (i.e. wrongly supplied) or that the parts supply is delayed. This leads to quick and efficient countermeasures against wrong supply or delay in parts supply.

This embodiment has a configuration to determine a progress status of the parts supply. Hereinafter, the configuration is described in detail.

In this embodiment, the respective parts boxes B that exist on the trolleys 21, 22 and 23 are identified based on the information of the RFID tags T (T1, T2, T3 and so on) that are respectively attached to the parts boxes B (B1, B2, B3 and so on) on the trolleys 21, 22 and 23 and that are read by the ID tag reading devices 4A, 4B and 4C. Then, the information is generated on progress status of transport of the respective parts boxes B (B1, B2, B3 and so on) to the part-supply places PS1, PS2, PS3 and PS4, and furthermore an image based on the information is displayed on the monitoring device 5.

In order to perform the above, the host computer 3 includes: a progress management section 32; a display image generation section 33; and an information storage section 34. Also, the monitoring device 5 includes a display section 52.

The progress management section 32 of the host computer 3 reads the information of the RFID tags T that is received by the transceiver 31 from the monitoring device 5 so as to recognize the information of the respective RFID tags T read by the ID tag reading devices 4A, 4B and 4C at the respective reading timings. In this way, the host computer 3 recognizes whether the parts boxes B (B1, B2, B3 and so on) exist or not on the respective trolleys 21, 22 and 23 at the respective timings.

In particular, the first part-supply place PS1 requests to unload four parts boxes B (i.e. the first parts box B1, the second parts box B2, the third parts box B3 and the fourth parts box B4). The second part-supply place PS2 requests to unload four parts boxes B (i.e. the fifth parts box B5, the sixth parts box B6, the seventh parts box B7 and the eighth parts box B8). The third part-supply place PS3 requests to unload the ninth parts box B9. The fourth part-supply place PS4 requests to unload the tenth parts box B10. In this case, if the parts supply is appropriately performed, the four parts boxes B (the first parts box B1, the second parts box B2, the third parts box B3 and the fourth parts box B4) are unloaded from the first trolley 21 when the tow vehicle 24 arrives at the first part-supply place PS1. Then, when the tow vehicle 24 leaves or departs from the first part-supply place PS1, the information of the RFID tags T1 to T4 is not read any more, accordingly, the information of the RFID tags T5 to T10 is transmitted from the monitoring device 5 as the information of the RFID tags T. From this, the progress management section 32 of the host computer 3 recognizes that the parts boxes B5 to B10 remain on the trolleys 21, 22 and/or 23. In other words, it recognizes that the parts boxes B1 to B4 have been unloaded.

Also, the four parts boxes B (the fifth parts box B5, the sixth parts box B6, the seventh parts box B7 and the eighth parts box B8) are unloaded from the second trolley 22 when the tow vehicle 24 arrives at the second part-supply place PS2. Then, when the tow vehicle 24 leaves or departs from the second part-supply place PS2, the information of the RFID tags T5 to T8 is not read any more, accordingly, the information of the RFID tags T9 and T10 is transmitted from the monitoring device 5 as the information of the RFID tags T. From this, the progress management section 32 of the host computer 3 recognizes that the parts boxes B9 and B10 remain on the trolleys 21, 22 and/or 23. In other words, it recognizes that the parts boxes B5 to B8 have also been unloaded in addition to the parts boxes B1 to B4.

The ninth parts box B9 is unloaded from third trolley 23 when the tow vehicle 24 arrives at the third part-supply place PS3. Then, when the tow vehicle 24 leaves or departs from the third part-supply place PS3, the information of the RFID tag T9 is not read any more, accordingly, the information of only the RFID tag T10 is transmitted from the monitoring device 5 as the information of the RFID tag T. From this, the progress management section 32 of the host computer 3 recognizes that only the parts box B10 remains on the trolleys 21, 22 and/or 23. In other words, it recognizes that the parts box B9 has also been unloaded in addition to the parts boxes B1 to B8.

Furthermore, the tenth parts box B10 is unloaded from third trolley 23 when the tow vehicle 24 arrives at the fourth part-supply place PS4. Then, when the tow vehicle 24 leaves or departs from the fourth part-supply place PS4, the information of the RFID tag T10 is not read any more, accordingly, no information of the RFID tags T is transmitted from the monitoring device 5. From this, the progress management section 32 of the host computer 3 recognizes that there are no parts boxes on the trolleys 21, 22 and 23. In other words, it recognizes that all the parts boxes B1 to B10 have been unloaded.

FIG. 4 is a table indicating relationships between the locations of the trolleys 21, 22 and 23, and the kinds of RFID tags T that are read/are not read at the respective locations when the parts boxes B1 to B10 are unloaded as described above.

As described above, the progress management section 32 determines the status of the parts boxes B1 to B10 respectively unloaded from the trolleys 21, 22 and 23 at the respective timings by recognizing the information of the RFID tags T (T1, T2, T3 and so on). Thus, the progress management section 32 generates information on progress status of parts supply operation in respect of the respective parts boxes B1 to B10. That is, the progress management section 32 generates information associating the respective timings with the parts boxes B1 to B10 unloaded from the trolleys 21, 22 and 23 at the respective timings.

The display image generation section 33 receives information (i.e. information on progress status of parts supply operation in respect of the respective parts boxes B1 to B10) generated by the progress management section 32, and generates an image to be displayed on the monitoring device 5. Examples of the images generated here include: an image indicating whether delay in the parts supply operation occurs or not; and an image indicating a progress rate that is a ratio of completed parts supply operations to all the parts supply operations. A detail description on the images will be given later.

The information storage section 34 receives and stores the information (information on progress status of parts supply operation in respect of the respective parts boxes B1 to B10) generated by the progress management section 32. Such stored information can be used to analyze a cause of wrong supply or delay in parts supply when such an incident occurs.

The display section 52 of the monitoring device 5 receives information on the image generated by the display image generation section 33, and displays the image on a screen according to the received information. That is, the display section 52 can display the images such as an image indicating whether delay in the parts supply operation occurs or not, and an image indicating a progress rate that is a ratio of completed parts supply operations to all the parts supply operations.

Also, the display section 52 of the monitoring device 5 receives, via the host computer 3, the information on the part-supply places P51, PS2, PS3 and PS4 where the respective parts boxes B1 to B10 are to be unloaded out of the information stored in the database DB, so that the display section 52 displays the above information on the screen. In this embodiment, the display contents are the following: the parts boxes B to be unloaded at the first part-supply place PS1 are the four parts boxes (the first parts box B1, the second parts box B2, the third parts box B3 and the fourth parts box B4); the parts boxes B to be unloaded at the second part-supply place PS2 are the four parts boxes (the fifth parts box B5, the sixth parts box B6, the seventh parts box B7 and the eighth parts box B8); the parts box B to be unloaded at the third part-supply place PS3 is the ninth parts box B9; and the parts box B to be unloaded at the fourth part-supply place PS4 is the tenth parts box B10. The worker M understands which parts boxes B should be unloaded at the respective part-supply places PS1 to PS4 by looking at the display, and unloads actually the parts boxes B from the trolleys 21, 22 and 23. Thus, the worker M is not required to memorize which parts boxes B should be unloaded at the respective part-supply places PS1, PS2, PS3 and PS4, which can reduce the burden on the worker M and also prevent the wrong supply of the parts boxes B (i.e. the parts boxes B being unloaded at the wrong part-supply places).

Figure 5:
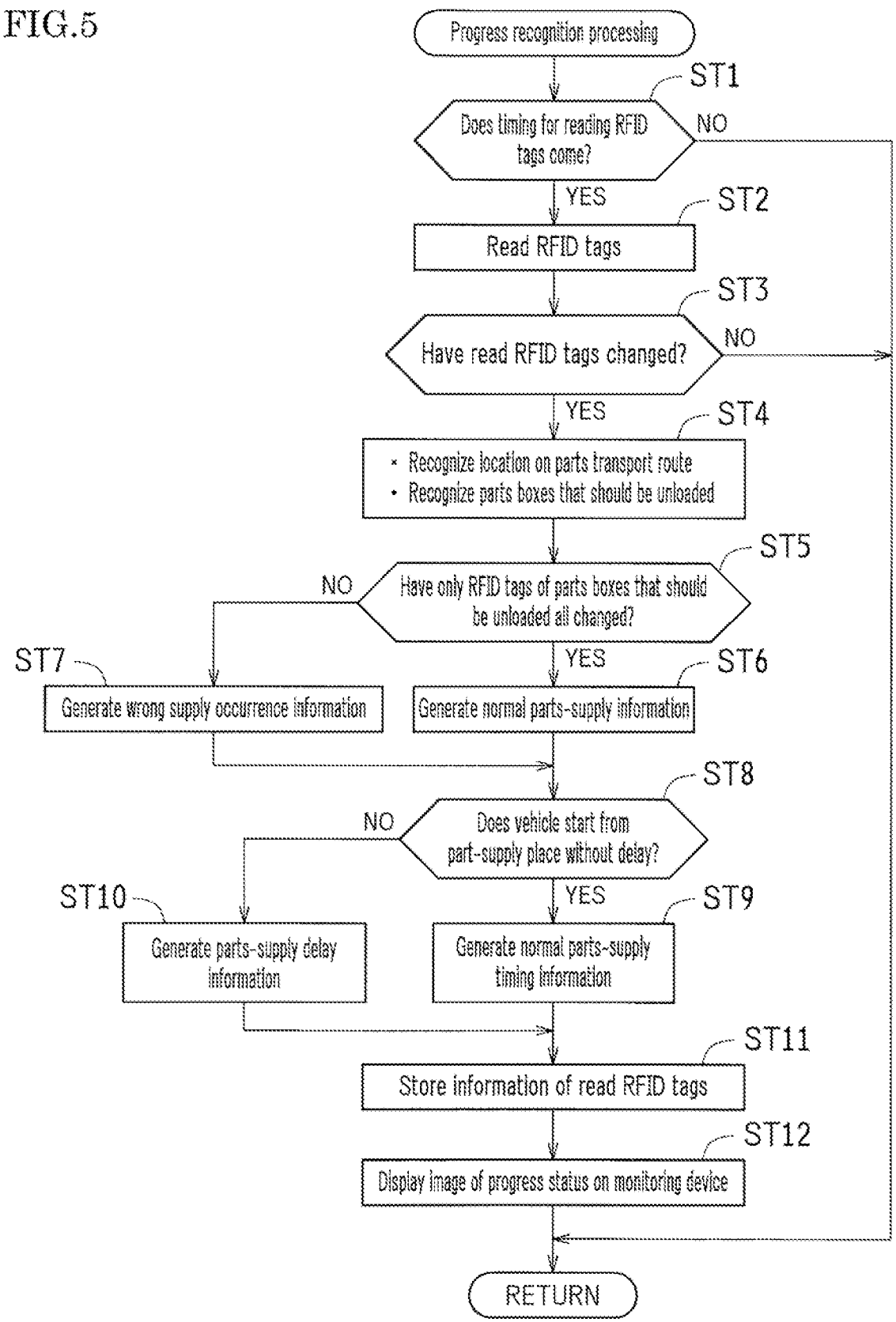
FIG. 5 is a flowchart indicating procedures of progress recognition processing.

Here, the procedures of the progress recognition processing are described with reference to the flowchart of FIG. 5. This flowchart is repeatedly performed under the condition that the trolleys 21, 22 and 23 on which the parts boxes B (B1 to B10) are loaded leave or depart from the parts receiving station IS.

First, in step ST1, it is determined whether the timing for reading the RFID tags T comes or not. As described above, the reader-writer 42 reads the information of the RFID tags T (T1, T2, T3 and so on) at a predetermined time interval. Therefore, in step S1, it is determined to be "YES" at the predetermined time interval.

When the timing for reading the RFID tags T comes and it is determined to be "YES" in step ST1, the procedure advances to step ST2 where the information of the RFID tags T (T1, T2, T3 and so on) is read by the reader-writer 42.

After that, the procedure advances to step ST3 where it is determined whether the information of the RFID tags T (T1, T2, T3 and so on) read by the reader-writer 42 has changed or not. More specifically, it is determined whether the number of the read information of the RFID tags T (T1, T2, T3 and so on) decreases or not by comparing the information of the RFID tags T (T1, T2, T3 and so on) read in the previous routine to the information of the RFID tags T (T1, T2, T3 and so on) read in the current routine. The decrease in the number of the read information of the RFID tags T (T1, T2, T3 and so on) means that parts of the parts boxes B have been unloaded from the trolleys 21, 22 and 23.

When the information of the RFID tags T (T1, T2, T3 and so on) read by the reader-writer 42 has not changed and it is determined to be "NO" in the step ST3, the procedure returns.

On the other hand, when the information of the RFID tags T (T1, T2, T3 and so on) read by the reader-writer 42 has changed and it is determined to be "YES" in the step ST3, the procedure advances to step ST4. In step ST4, the current location of the tow vehicle 24 on the parts transport route L2 is recognized as well as the parts boxes B that should be unloaded at this time point. Specifically, when the tow vehicle 24 is between the parts receiving station IS and the first part-supply place PS1, there is no parts box B to be unloaded. When the tow vehicle 24 is between the first part-supply place PS1 and the second part-supply place PS2, the parts boxes B that should be unloaded are the parts boxes B1 to B4. When the tow vehicle 24 is between the second part-supply place PS2 and the third part-supply place PS3, the parts boxes B that should be unloaded are the parts boxes B5 to B8 in addition to the parts boxes B1 to B4. When the tow vehicle 24 is between the third part-supply place PS3 and the fourth part-supply place PS4, the parts box B that should be unloaded is the parts box B9 in addition to the parts boxes B1 to B8. When the tow vehicle 24 is downstream of the fourth part-supply place PS4, the parts box B that should be unloaded is the parts box B10 in addition to the parts boxes B1 to B9.

In step ST5, it is determined whether only the RFID tags T of the parts boxes B that should be unloaded have all changed or not (whether the correctly corresponding RFID tags only have changed). That is, it is determined whether the RFID tags T of the parts boxes B that should be unloaded have appropriately changed without excess or deficiency, matching the above-described relation between the current location of the tow vehicle 24 on the parts transport route L2 and the parts boxes B that should be unloaded.

Figure 6:
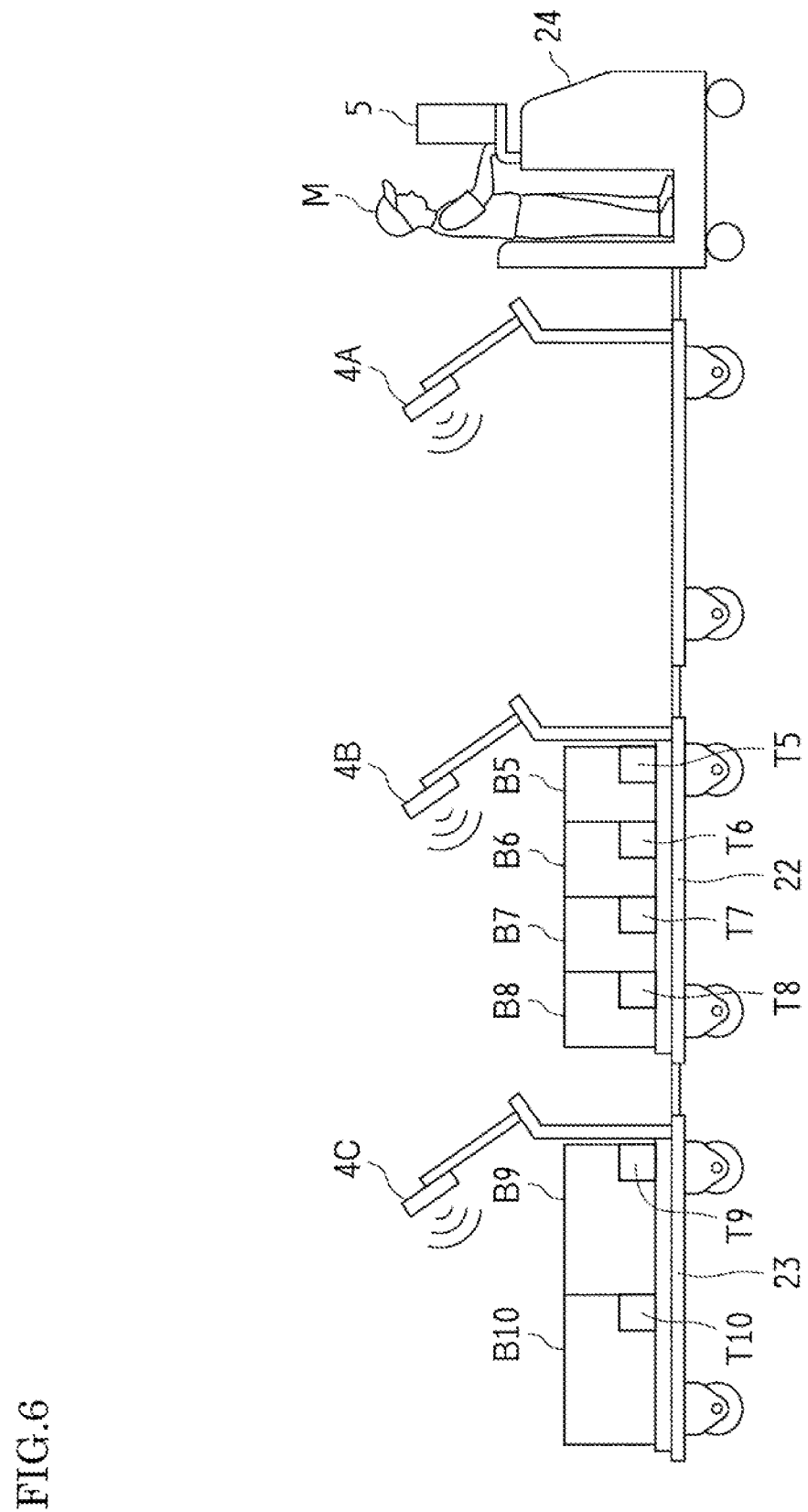
FIG. 6 is a diagram corresponding to FIG. 2, which illustrates the trolleys at the time of leaving or departing from a first part-supply place.

When it is determined that only the RFID tags T of the parts boxes B that should be unloaded have all changed and it is determined to be "YES" in step ST5, the procedure advances to step ST6. In step ST6, normal parts-supply information is generated to indicate that the parts boxes B are currently supplied appropriately without excess or deficiency. For example, when the tow vehicle 24 leaves or departs from the first part-supply place PS1 and furthermore when no parts box remains on the first trolley 21 while the four parts boxes (the fifth parts box B5, the sixth parts box B6, the seventh parts box B7 and the eighth parts box B8) are placed on the second trolley 22 as well as the two parts boxes (the ninth parts box B9 and the tenth parts box B10) are placed on the third trolley 23 as shown in FIG. 6, the normal parts-supply information is generated to indicate that the parts boxes B are supplied appropriately without excess or deficiency at the time when the vehicle 24 leaves or departs from the first part-supply place PS1.

On the other hand, when it is determined to be "NO" in step ST5, the procedure advances to step ST7. In step ST7, wrong supply occurrence information is generated to indicate there is any excess or deficiency in the supply of the parts boxes B at any part-supply place PS.

In step ST8, it is determined whether the leaving or departing of the tow vehicle 24 from the respective part-supply places PS is delayed or not by comparing the current location of the tow vehicle 24 to data on parts supply timing (i.e. information on timings when the respective parts boxes B1 to B10 are supplied to the part-supply places PS1, PS2, PS3 and PS4) stored in the database DB.

When the tow vehicle 24 leaves or departs from the respective part-supply places PS without delay and it is determined to be "YES" in step ST8, the procedure advances to step ST9. In step ST9, normal parts-supply timing information is generated to indicate that the parts supply is currently not delayed. On the other hand, when it is determined to be "NO" in step ST8, the procedure advances to step ST10. In step ST10, parts-supply delay information is generated to indicate that the parts supply is currently delayed.

After that, the procedure advances to step ST11. In step ST11, the generated information as described above is stored in the information storage section 34.

As described above, after generation of the information on excess/deficiency of the parts supply as well as the information on the delay in the parts supply, the procedure advances to step ST12. In the step ST12, the image of progress status based on the information is displayed on the monitoring device 5.

The above-described procedure is repeatedly performed until the supply of all the parts boxes B (B1 to B10) is completed.

Figure 7:
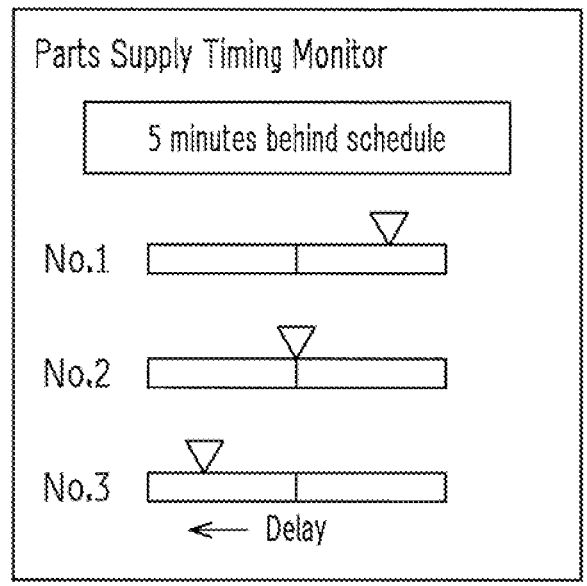
FIG. 7 is a diagram illustrating one example of an image of progress status on a monitoring device.
Figure 8:
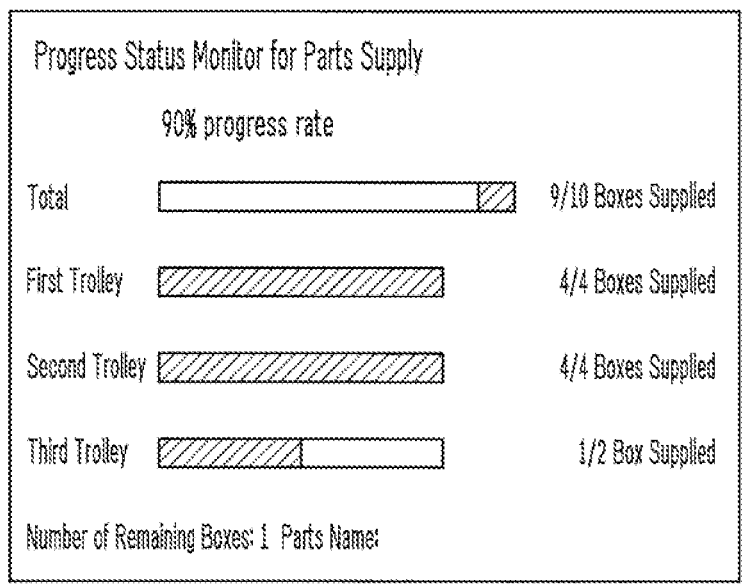
FIG. 8 is a diagram illustrating another example of the image of progress status on the monitoring device.

FIGS. 7 and 8 are diagrams each illustrating an example of an image of progress status on the monitoring device 5. FIG. 7 illustrates an example of the display of a monitor image of parts supply timing while FIG. 8 illustrates an example of the display of a monitor image of progress status of parts supply. These images may be switched by the worker M who operates a button on the monitoring device 5. Also, these images may be displayed side by side.

In a monitor image of parts supply timing as shown in FIG. 7, the display indicates the actual timings when the respective parts boxes B (B1 to B10) are supplied to the part-supply places PS1, PS2, PS3 and PS4 relative to the timings when the respective parts boxes B (B1 to B10) should be supplied. In the image shown in FIG. 7, the first part-supply place PS1 is represented by "No. 1", the second part-supply place PS2 is represented by "No. 2", and the third part-supply place PS3 is represented by "No. 3". Also, the sign "∇" on each indicator bar of the image indicates the actual timing of parts supply. Thus, if this sign is positioned at the center of the indicator bar, it means that the supply timing is appropriate. If the sign is positioned on the right side relative to the center of the indicator bar, it means that the supply timing is advanced. If the sign is positioned on the left side relative to the center of the indicator bar, it means that the supply timing is delayed. Thus, in FIG. 7, when the parts boxes B1 to B9 have been completely supplied to the first part-supply place PS1 to the third part-supply place PS3, the display indicates: the supply timing of the parts boxes B (B1 to B4) to the first part-supply place PS1 is advanced relative to the appropriate timing; the supply timing of the parts boxes B (B5 to B8) to the second part-supply place PS2 is the appropriate timing; and the supply timing of the parts boxes B (B9) to the third part-supply place PS3 is delayed relative to the appropriate timing. And lastly, it is indicated that the current supply timing is delayed by five minutes relative to the appropriate timing.

In a monitor image of progress status of parts supply as shown in FIG. 8, the display indicates each progress rate that is a ratio of completed parts supply operations to all the parts supply operations. In the example shown in FIG. 8, the supply of the four parts boxes B (B1 to B4) placed on the first trolley 21 has been completed, the supply of the four parts boxes B (B5 to B8) placed on the second trolley 22 has been completed, and the supply of the one parts box B9 out of the two parts boxes B (B9 and B10) placed on the third trolley 23 has been completed. Thus, the display indicates the progress rate of 90%, because the supply of 9 parts boxes out of 10 parts boxes has been completed.

—Effects of Embodiment—

As described above, in the parts supply system 1 in this embodiment, a plurality of parts boxes B (B1 to B10) is transported by a plurality of trolleys 21, 22 and 23 on the parts transport route L2 while the parts boxes B (B1 to B10) are unloaded from the trolleys 21, 22 and 23 at the respectively corresponding part-supply places (part-supply places PS1, PS2, PS3 and PS4) provided on the parts transport route L2. The information of the RFID tags T (T1 to T10) that are respectively applied to the plurality of parts boxes B (B1 to B10) is read by the ID tag reading devices 4A, 4B and 4C respectively mounted on the trolleys 21, 22 and 23. Thus, the respective parts boxes B (B1 to B10) that exist on the trolleys 21, 22 and 23 are identified. Based on the above, information is generated on progress status of supply of the respective parts boxes B (B1 to B10) to the part-supply places PS1, PS2, PS3 and PS4, and furthermore an image based on the information is displayed on the monitoring device 5 as an image of progress status. In this way, it is possible to recognize the progress status of supply of the respective parts boxes B (B1 to B10) to the part-supply places PS1, PS2, PS3 and PS4.

Also in this embodiment, the information of the RFID tags T is read by the ID tag reading devices 4A, 4B and 4C respectively mounted on the trolleys 21, 22 and 23. Thus, it is possible to recognize the parts boxes B (B1 to B10) that exist on the trolleys 21, 22 and 23 from the time point when the trolleys 21, 22 and 23 leave or depart from the parts receiving station IS. Therefore, it is also possible to recognize the progress status of supply of the parts boxes B (B1 to B10) from the above time point.

Also, at the time point when any excess/deficiency in the supply of the parts boxes B (B1 to B10) at the respective part-supply places PS1, PS2, PS3 and PS4 occurs, the information on the excess/deficiency is generated. Furthermore, at the time point when the supply timing of any of the parts boxes B (B1 to B10) is delayed, the information on the delay in parts supply is generated. Thus, it is possible to rapidly take countermeasures against the above troubles, which results in early solutions to the problems such as excess/deficiency in the supply of the parts boxes B (B1 to B10), and delay in the supply timing of any of the parts boxes B (B1 to B10). For example, when the information on the deficiency in the supply of the specific parts box B is generated, it is possible to address the problem by moving, for example, another trolley to the part-supply place (part-supply place where the supply of the specific parts box B is lacked) PS so as to fill up the deficiency of the parts box B.

Also, since the information of the RFID tags T is read by the ID tag reading devices 4A, 4B and 4C respectively mounted on the trolleys 21, 22 and 23, it is possible to conduct acceptance inspection (inspection to confirm whether the parts have been delivered according to the order or not) of the parts boxes B (B1 to B10) when the parts boxes B (B1 to B10) are placed on the trolleys 21, 22 and 23. That is, it is possible to transport the parts boxes B (B1 to B10) while conducting the acceptance inspection, which means that it is not necessary to conduct the acceptance inspection at the parts receiving station IS. Accordingly, it is possible to improve work efficiency.

Also, since the information storage section 34 stores the information on the excess/deficiency in parts supply as well as the information on the delay in parts supply, it is easy, after completion of parts supply, to specify the kind(s) of the parts box B and/or the part-supply place PS that is/are likely to cause the excess/deficiency in parts supply, or to specify the kind(s) of the parts box B and/or the part-supply place PS that is/are likely to cause the delay in parts supply. Therefore, it is possible to easily develop measures to eliminate the excess/deficiency in parts supply and/or the delay in parts supply.

Also, since the ID tag reading devices 4A, 4B and 4C are respectively mounted on the trolleys 21, 22 and 23, it is possible to construct the system using only Wi-Fi (Wireless Fidelity) communication even when the plant site covers a wide area. Thus, it is possible to reduce costs.

—Variation 1—

Figure 9:
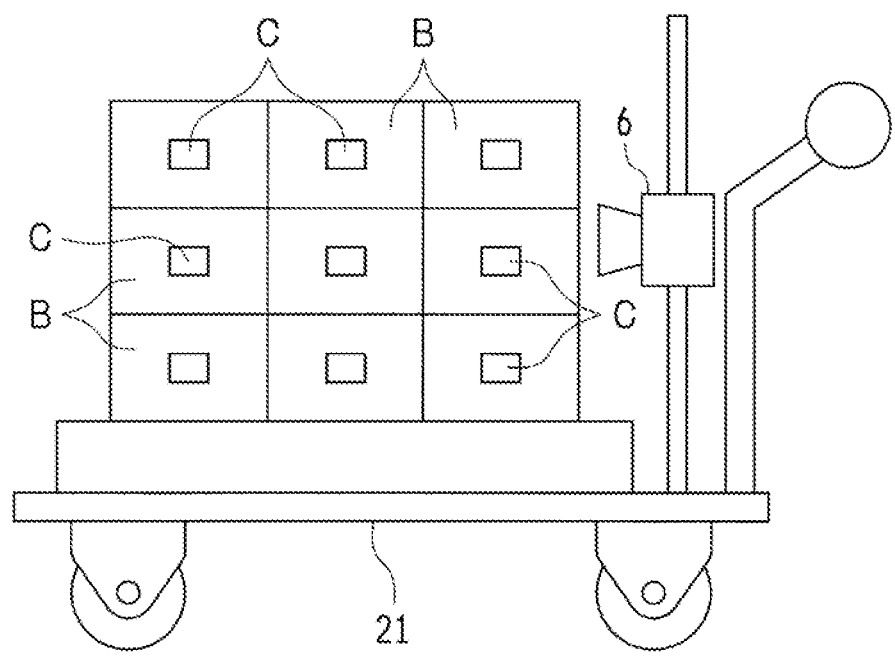
FIG. 9 is a diagram illustrating a trolley of Variation 1.

Next, a description is given on Variation 1. In the above-described embodiment, the ID tag reading devices 4A, 4B and 4C read the information of RFID tags T (T1, T2, T3 and so on) respectively attached to the plurality of parts boxes B1 to B10. In Variation 1 as shown in FIG. 9 (showing one trolley 21), in place of the RFID tags, two-dimensional codes C such as QR codes (registered trademark) are respectively attached to the plurality of parts boxes B placed on the trolley 21. Images of the two-dimensional codes C are taken by a camera 6 mounted on the trolley 21 (or the camera 6 may be provided for every trolley 21, 22 and 23). Thus, information of the two-dimensional codes C is read.

In this Variation also, the two-dimensional codes C respectively attached to the parts boxes B each have a different ID. Thus, the respective parts boxes B can be individually recognized (i.e. the parts boxes B are respectively identified) by reading the information of the two-dimensional codes C.

In this Variation also, the same effect as the above-described embodiment can be provided (i.e. to recognize the progress status of supply of the parts boxes B to the respective part-supply places PS1, PS2, PS3 and PS4).

—Variation 2—

Figure 10:
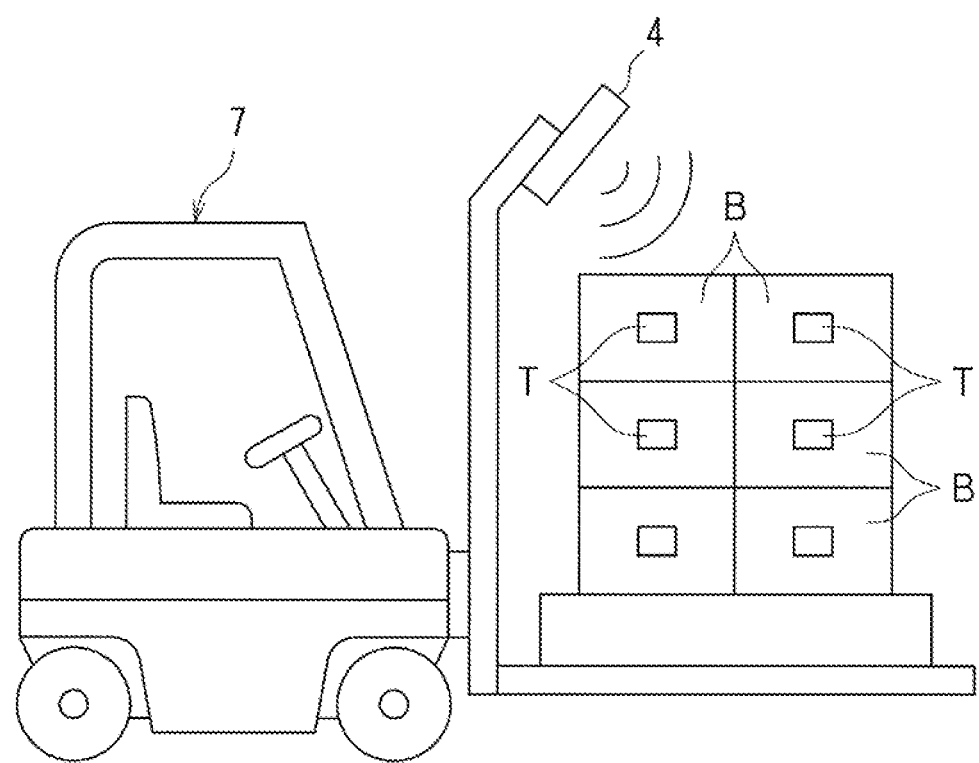
FIG. 10 is a diagram illustrating a forklift of Variation 2, which transports a plurality of parts boxes.

Next, a description is given on Variation 2. In Variation 2 as shown in FIG. 10, the plurality of parts boxes B is transported by a forklift 7. Thus, the ID tag reading device 4 mounted on the forklift 7 reads the information of the RFID tags T respectively attached to the parts boxes B. That is, specific parts boxes B needed for the respective part-supply places PS1, PS2, PS3 and PS4 are sequentially unloaded at respectively corresponding part-supply places while the forklift 7 is moved along the parts transport route L2.

In this Variation, the RFID tags T respectively attached to the parts boxes B each have a different ID. Thus, the respective parts boxes B can be individually recognized (i.e. the parts boxes B are respectively identified) by reading the information of the RFID tags T.

In this Variation also, the same effect as the above-described embodiment can be provided (i.e. it is possible to recognize the progress status of supply of the parts boxes B to the respective part-supply places PS1, PS2, PS3 and PS4).

—Variation 3—

Figure 11:
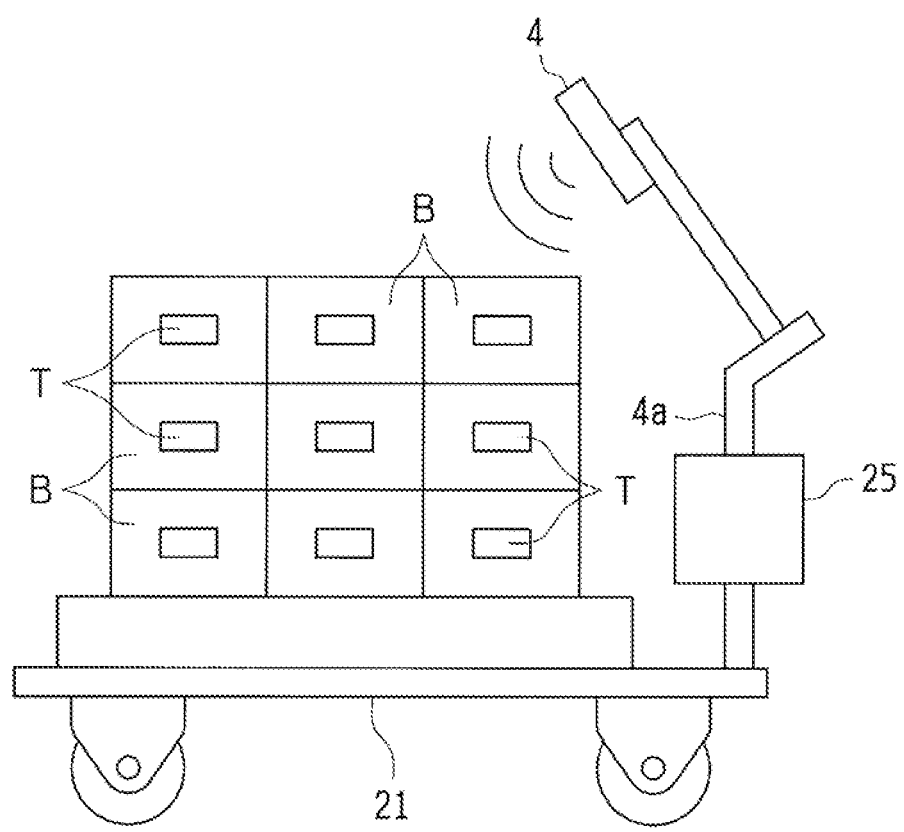
FIG. 11 is a diagram illustrating a trolley of Variation 3.

Next, a description is given on Variation 3. In this Variation, the self-propelled trolley 21 is used. An electric motor is mounted on a wheel of the trolley 21. As shown in FIG. 11, a controller (control unit) 25, which controls the travel of the trolley 21, is provided on a support member 4a that supports the ID tag reading device 4. The other components are the same as those in the above-described embodiment. Since the trolley 21 is not towed in this Variation, it is not necessary to couple the plurality of trolleys 21. Alternatively, at least one trolley may be configured as a self-propelled type in the configuration in which the plurality of trolleys are coupled.

In this Variation, in addition to provide the same effect as the above-described embodiment, it is possible to control the travel (the destination) of the trolley 21 based on the information of the read RFID tags T (i.e. information on progress status generated by the progress management section 32). For example, in the case in which the trolley 21 still contains the parts box B that should be unloaded at the part-supply place PS where the trolley 21 has already passed, it is possible to control the travel of the trolley 21 such that the trolley 21 returns to the passed part-supply place PS.

Other Embodiments

The present invention is not limited to the above-described embodiment and the Variations. All modifications and changes that come within the meaning and range of equivalency of the claims are intended to be embraced therein.

For example, in the above-described embodiment and the Variations, the parts supply system 1 of the present invention is applied to an automobile manufacturing plant. However, the present invention is not limited thereto. The parts supply system 1 may be applied to a manufacturing plant other than the automobile manufacturing plant, or may be applied to transport of articles in a warehouse.

Also, in the above-described embodiment and Variations 1 and 3, the ID tag reading devices 4 are respectively mounted on the trolleys 21, 22 and 23. However, the ID tag reading device may be mounted on only one trolley so that the ID tag reading device reads all the information of the RFID tags attached respectively to all the parts boxes. In other words, the number of the trolleys 21, 22 and 23 is not necessarily the same as the number of the ID tag reading devices 4, provided that all the information of the RFID tags attached respectively to all the parts boxes can be read.

Also in the above-described embodiment and Variation 1, the plurality of trolleys 21, 22 and 23 are coupled and towed by the tow vehicle 24 and transported along the parts transport route L2. However, the present invention is not limited thereto. A plurality of parts boxes may be placed on one trolley that is towed by the tow vehicle 24 and transported along the parts transport route L2.

Also in the above-described embodiment and the Variations, it is supposed that the parts boxes B are unloaded by the worker to the respective part-supply places PS1, PS2, PS3 and PS4. However, it is possible to unload the parts boxes B by a robot or the like.

INDUSTRIAL APPLICABILITY

The present invention is suitable for a parts supply system in which a plurality of parts boxes is transported by a trolley while specific parts boxes are unloaded from the trolley at the respective part-supply places provided on the parts transport route.

REFERENCE SIGNS LIST

1 Parts supply system (article transport system)
21 First trolley (transport vehicle)
22 Second trolley (transport vehicle)
23 Third trolley (transport vehicle)
25 Controller (control unit)
3 Host computer
32 Progress management section
34 Information storage section
4 ID tag reading device (tag reading device)
5 Monitoring device (display device)
6 Camera (tag reading device)
7 Forklift (transport vehicle)
L2 Parts transport route (transport route)
B, B1 to B10 Parts box (article)
T, T1 to T10 RFID tag
PS1 First part-supply place (unloading place)
PS2 Second part-supply place (unloading place)
PS3 Third part-supply place (unloading place)

What is claimed is:
1. An article transport system, comprising:
at least one transport vehicle configured to transport a plurality of articles along a transport route, the plurality of articles being unloaded from the at least one transport vehicle at respective unloading places along the transport route, each article of the plurality of articles corresponding to a respective unloading place of the unloading places along the transport route;
a plurality of tags, each tag of the plurality of tags being applied to a corresponding article of the plurality of articles, each tag configured to individually identify the corresponding article of the plurality of articles;
a tag reading device mounted on the at least one transport vehicle configured to read tag information of the plurality of tags; and
a progress management section configured to determine a progress status of a supply of the plurality of articles at each of the unloading places, wherein the determining of the progress status comprises determining whether the tag information, read by the tag reading device, matches an expected set of tags, based on a location of the at least one transport vehicle and a relationship between locations of the at least one transport vehicle and respective sets of tags from the plurality of tags that are to exist on the at least one transport vehicle.

2. The article transport system according to claim 1, wherein
- each tag of the plurality of tags applied to the corresponding article of the plurality of articles is a radio frequency identification (RFID) tag, and
- the tag reading device is an ID tag reading device configured to read RFID information of the plurality of tags.

3. The article transport system according to claim 1, wherein
- each tag of the plurality of tags applied to the corresponding article of the plurality of articles is a two-dimensional code, and
- the tag reading device is a camera configured to capture an identification image of the two-dimensional code.

4. The article transport system according to claim 1, further comprising an information storage section configured to store an indication of the progress status determined by the progress management section.

5. The article transport system according to claim 4, wherein
- each tag of the plurality of tags applied to the corresponding article of the plurality of articles is a radio frequency identification (RFID) tag, and
- the tag reading device is an ID tag reading device configured to read RFID information of the plurality of tags.

6. The article transport system according to claim 4, wherein
- each tag of the plurality of tags applied to the corresponding article of the plurality of articles is a two-dimensional code, and
- the tag reading device is a camera configured to capture an identification image of the two-dimensional code.

7. The article transport system according to claim 1, wherein
- the at least one transport vehicle is a self-propelled vehicle
- that includes a control section for controlling travel of the at least one transport vehicle,
- on the progress status determined by the progress management section.

8. The article transport system according to claim 7, wherein
- each tag of the plurality of tags applied to the corresponding article of the plurality of articles is a radio frequency identification (RFID) tag, and
- the tag reading device is an ID tag reading device configured to read RFID information of the plurality of tags.

9. The article transport system according to claim 7, further comprising an information storage section configured to store an indication of the progress status determined by the progress management section.

10. The article transport system according to claim 9, wherein
- each tag of the plurality of tags applied to the corresponding article of the plurality of articles is a radio frequency identification (RFID) tag, and
- the tag reading device is an ID tag reading device configured to read RFID information of the plurality of tags.

11. The article transport system according to claim 9, wherein
- each tag of the plurality of tags applied to the corresponding article of the plurality of articles is a two-dimensional code, and
- the tag reading device is a camera configured to capture an identification image of the two-dimensional code.

12. The article transport system according to claim 7, wherein
- each tag of the plurality of tags applied to the corresponding article of the plurality of articles is a two-dimensional code, and
- the tag reading device is a camera configured to capture an identification image of the two-dimensional code.

13. The article transport system according to claim 1, wherein
- the at least one transport vehicle comprises at least one trolley that is towed by a tow vehicle that is driven by a worker, the at least one trolley being transported on the transport route, and
- the article transport system further comprises a display device that is carried by the worker or is mounted on the tow vehicle, and is configured to display a status image based on the progress status determined by the progress management section.

14. The article transport system according to claim 13, wherein
- each tag of the plurality of tags applied to the corresponding article of the plurality of articles is a two-dimensional code, and
- the tag reading device is a camera configured to capture an identification image of the two-dimensional code.

15. The article transport system according to claim 13, wherein
- the display device is further configured to display information of one or more articles of the plurality of articles that are to be unloaded at each respective unloading place of the unloading places along the transport route.

16. The article transport system according to claim 15, wherein
- each tag of the plurality of tags applied to the corresponding article of the plurality of articles is a radio frequency identification (RFID) tag, and
- the tag reading device is an ID tag reading device configured to read RFID information of the plurality of tags.

17. The article transport system according to claim 13, wherein
- each tag of the plurality of tags applied to the corresponding article of the plurality of articles is a radio frequency identification (RFID) tag, and
- the tag reading device is an ID tag reading device configured to read RFID information of the plurality of tags.

18. The article transport system according to claim 13, further comprising an information storage section configured to store an indication of the progress status determined by the progress management section.

19. The article transport system according to claim 18, wherein
- each tag of the plurality of tags applied to the corresponding article of the plurality of articles is a radio frequency identification (RFID) tag, and
- the tag reading device is an ID tag reading device configured to read RFID information of the plurality of tags.

20. The article transport system according to claim 18, wherein
- each tag of the plurality of tags applied to the corresponding article of the plurality of articles is a two-dimensional code, and
- the tag reading device is a camera configured to capture an identification image of the two-dimensional code.

\* \* \* \* \*